United States Patent [19]

Bryant

[11] Patent Number: 5,716,488
[45] Date of Patent: Feb. 10, 1998

[54] REUSABLE VACUUM BAG FOR MAKING LAMINATED ARTICLES

[75] Inventor: William J. Bryant, Wichita, Kans.

[73] Assignee: The Boeing Company, Seattle, Wash.

[21] Appl. No.: 703,219

[22] Filed: Aug. 26, 1996

[51] Int. Cl.$^6$ ............................................. B32B 31/20
[52] U.S. Cl. ..................... 156/382; 156/286; 156/580; 425/388
[58] Field of Search ..................... 156/94, 285, 286, 156/381, 382, 157, 304.1, 304.6, 502, 580, 581, 583.1; 264/102; 425/388, 405.1

[56] References Cited

U.S. PATENT DOCUMENTS

| | | | |
|---|---|---|---|
| 3,861,977 | 1/1975 | Wiley | 156/242 |
| 4,287,015 | 9/1981 | Danner, Jr. | 156/382 |
| 4,554,036 | 11/1985 | Newsom | 156/94 |
| 4,681,651 | 7/1987 | Brozovic et al. | 156/382 |
| 4,886,442 | 12/1989 | McCowin et al. | 425/388 |
| 5,129,813 | 7/1992 | Shepherd | 425/504 |
| 5,445,310 | 8/1995 | Folmer | 228/173.6 |

*Primary Examiner*—James Sells
*Attorney, Agent, or Firm*—Lawrence W. Nelson

[57] ABSTRACT

A vacuum bag assembly used in making laminated articles having layers of composite materials and thermosetting resins that are formed and adhesively bonded together. The assembly includes a forming tool on which the composite materials and the thermosetting resins may be positioned. The composite materials have edges well spaced from edges of the forming tool. A vacuum bag is positioned over the composite material and the forming tool. The vacuum bag includes a flexible mat, having an irregular surface contiguous with the composite materials. The flexible mat also has edges well spaced from the edges of the forming tool. The vacuum bag also has a continuous flexible suction channel having an inner arch-like surface and an outer arch-like surface positioned between the edges of the flexible mat and the edges of the forming tool. The suction channel is attached to the flexible mat by a flexible connecting flange. Further, the flexible connecting flange, the outer surface of said suction channel, the edges of the flexible mat and the forming tool define the walls of an airspace positioned in between the flexible mat and the suction channel. The airspace is in pneumatic communication with the irregular surface of the flexible mat.

7 Claims, 2 Drawing Sheets

REUSABLE VACUUM BAG FOR MAKING LAMINATED ARTICLES

BACKGROUND OF THE INVENTION

1. Field of the Invention

The present invention relates to a vacuum bag, and more particularly to a reusable vacuum bag used to remove air over the surface of an area.

2. Background Information

Vacuum bags have long been used in industry on laminated articles comprised of composite materials that are adhesively bonded together. To make a composite or laminated article, oriented fiber layers with applied thermosetting resin are stacked upon a forming surface portion of a forming tool. A plastic bag sheet is then placed over the composite or laminated article. A double-sided sealing tape, such as chromium tape, is then continuously applied between the plastic bag sheet and the periphery of the forming tool. Thus, a volume defined by the plastic bag sheet and the forming tool is sealed off. A vacuum source in pneumatic communication with a space between the forming tool and the plastic bag sheet is used to draw a vacuum in the sealed off volume so that the plastic bag sheet is firmly pressed against the forming tool thereby forming the materials to the shape of the forming surface. The above steps are repeated to produce the composite or laminated article having a number of plies. Sheets of honeycomb core can also be laid upon or between layers of composite material to produce panels of various shapes and sizes. An additional step of heating the composite or laminated article while under pressure in an oven or pressurized autoclave oven can be used to cure the adhesive resins in and between the plies of the laminated materials. The above system may be used to produce a light-weight, high-strength laminated article that is capable of being used as an aircraft component.

Unfortunately, vacuum bags that use the a plastic bag sheet and the sealing tape are not very durable and cannot be used to apply more than a few layers of laminates before they are discarded and replace. Accordingly, when a given composite or laminated article is produced, a skilled worker must fashion the vacuum bag and then attempt to use it for as many operations as possible. Fabricating a vacuum bag for each article in a production run is time consuming and expensive. A large number of used vacuum bags must be thrown away adding unwanted solid waste. Consequently, there has long been a need for a method that employs a durable or reusable vacuum bag for laying-up a laminated article. Further, there is a need for a reusable vacuum bag that can be fashioned to any shape or size, and that is easy to use and does not require bulky edge support or edge fastenings. More particularly, there is a need for a reusable vacuum bag assembly that can form an airtight seal with a forming tool such that the periphery of the vacuum bag secures itself to the forming tool with an airtight seal when a vacuum is drawn in the vacuum bag.

SUMMARY OF THE INVENTION

In accordance with one aspect, the present invention relates to a vacuum bag assembly used in making laminated articles having layers of composite materials and thermosetting resins that are formed and adhesively bonded together. The assembly includes a forming tool on which the composite materials and the thermosetting resins may be positioned. The composite materials have edges well spaced from edges of the forming tool. A vacuum bag is positioned over the composite material and the forming tool. The vacuum bag includes a flexible mat, having an irregular surface contiguous with the composite materials. The flexible mat also has edges well spaced from the edges of the forming tool. The vacuum bag also has a continuous flexible suction channel having an inner arch-like surface and an outer arch-like surface positioned between the edges of the flexible mat and the edges of the forming tool. The suction channel is attached to the flexible mat by a flexible connecting flange. Further, the flexible connecting flange, the outer surface of said suction channel, the edges of the flexible mat and the forming tool define the walls of an airspace positioned in between the flexible mat and the suction channel. The airspace is in pneumatic communication with the irregular surface of the flexible mat.

DETAILED DESCRIPTION OF THE INVENTION

Figure 1:
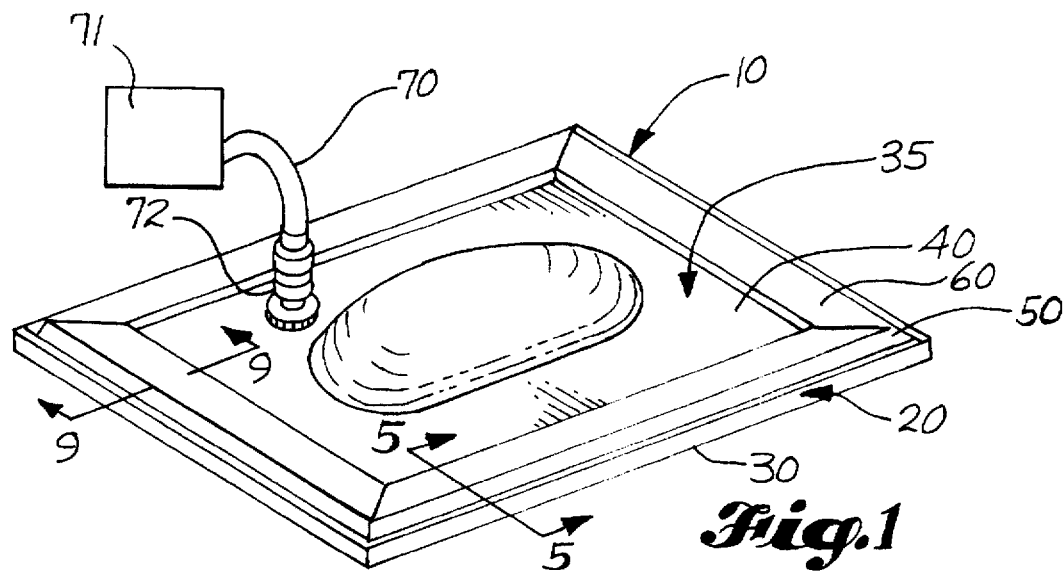
FIG. 1 shows a perspective view of a vacuum bag assembly.

FIG. 1 shows a vacuum bag assembly 10 including a vacuum bag 35 and forming tool 20. The forming tool 20 includes a substantially flat base 30 and a forming surface (not shown). The vacuum bag 35 comprises a flexible mat 40, a continuous suction channel 50, and connecting flange members 60 which are bonded to the suction channel 50 and the flexible mat 40. A vacuum line 70 leads to a vacuum source 71 and is connected to the flexible mat 40 with a fitting 72.

As can be seen in FIG. 1, the suction channel 50, the connecting flange members 60 and the base plate 30 are fashioned to negotiate corners around the periphery of the vacuum bag 35. These corners are formed by cutting the various sections at appropriate angles and then bonding the resulting pieces together using compatible, flexible adhesives.

Figure 2:
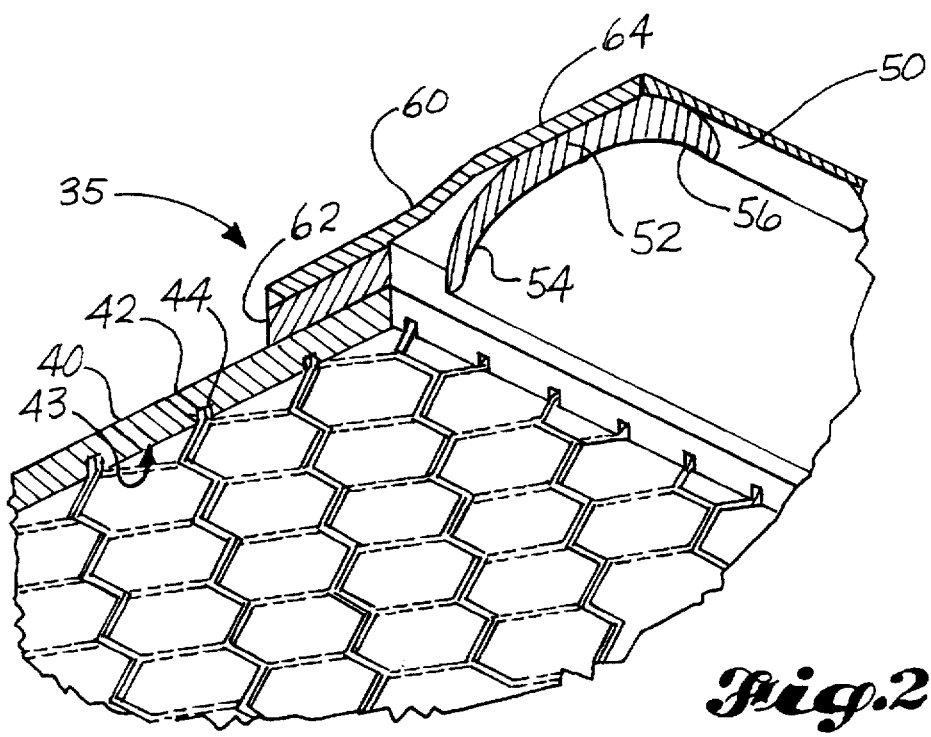
FIG. 2 shows a cross-sectional view of the vacuum bag taken along lines 5—5 of FIG. 1.

As shown in FIG. 2, the vacuum bag 35 comprises the flexible mat 40, the suction channel 50 and the connecting flange members 60. The flexible mat 40 has a substantially smooth upper surface 42 and a lower surface 43 that is embossed by a system of interconnecting channels 44. The system of interconnecting channels 44 provides a path for air to flow under the flexible mat 40. The smooth upper-surface 42 of the flexible mat 40 forms an air-tight seal with the fitting 72 and the vacuum line 70. In this way, the vacuum source 71 and the vacuum line 70 are in pneumatic communication with the system of interconnecting channels 44 embossed in the lower surface 43 of the flexible mat 40.

Figure 3:
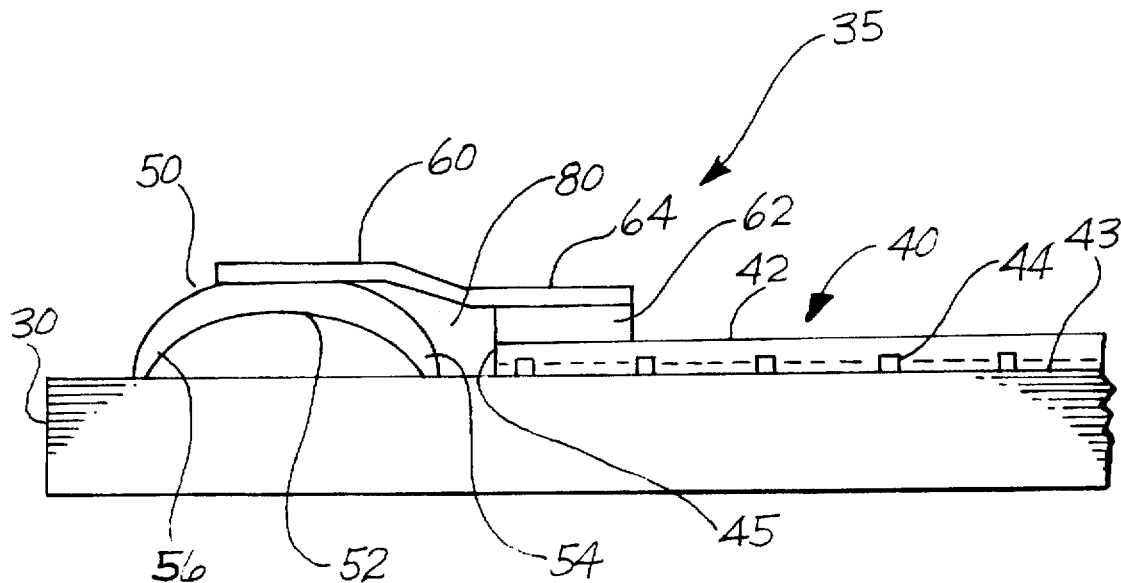
FIG. 3 shows a cross-sectional view of the vacuum bag taken from lines 9—9 of FIG. 1.

As shown in FIG. 3, the suction channel 50 has a "cup like" cross-section and includes a raised flat center portion 52, an inside leg 54, and in outside leg 56. The connecting flange members 60 comprises a spacer member 62 and a flange member 64. In an alternative embodiment, the connecting flange members 60 may comprise a single piece member (not shown). The connecting flange members 60 are airtight, and are bonded in an airtight manner to the smooth upper surface 42 of the flexible mat 40 at one end and to center the center portion 52 of the suction channel 50 at the other end.

The embossed lower surface 43, as shown in FIG. 3, of the flexible mat 40, is in continuous contact with the base plate 30. The suction channel 50 is spaced away from an outer edge 45 of the flexible mat 40. Further, the connecting flange members 60 are continuously bonded to the suction channel 50 and the spacer member 62, and the spacer member 62 is continuously bonded to the flexible mat 40. The inside leg 54 and the outside leg 56 of the suction channel 50 are in continuous contact with the base plate 30.

Figure 4:
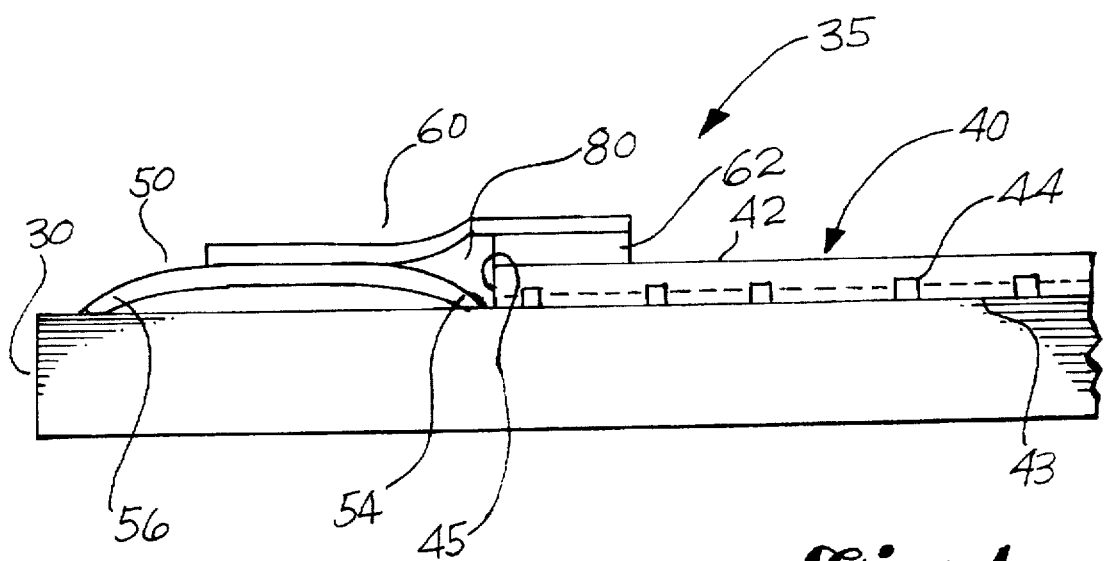
FIG. 4 shows a cross-sectional view of the vacuum bag taken along lines 9—9 of FIG. 1 with a vacuum applied to the bag.

As shown in FIG. 4, the inside leg 54 of the channel member 50, the connecting flange member 60, the spacer member 62, the outer edge 45 of the flexible mat 40, and the base plate 30 define a closed air space 80, which is disposed around the vacuum bag between the flexible mat 40 and the suction channel 50. The air space 80 and the system of air channels 44 define a vacuum volume of the vacuum bag 35.

FIG. 4 shows the flexible suction channel 50 being flattened against the base plate 30 by surrounding air pressure and by the vacuum formed in the closed space 80 so that the pressure of the air under channel 50 is substantially equal to the air pressure in the system of channels 44 and the closed air space 80. Should outside air leak between the outside leg 56 of the suction channel 50 and the base plate 30, the resulting higher air pressure under the suction channel 50 relative to that in the vacuum volume will urge the inside leg 54 of the suction channel away from the base plate 30 thereby allowing the leaked air to escape into the vacuum volume and thus reestablishing the vacuum under the suction channel 50. In this way, while a vacuum is drawn against the vacuum bag, the suction channel 50 continues to firmly adhere to the base plate 30 allowing the flexible mat 40 of the vacuum bag 35 to press a laminated composite article down upon the forming surface of the forming tool 20.

For simplicity, the base plate 30 as shown in FIGS. 1–4 has been represented as a substantially flat member. An embodiment of the present invention can be fashioned to conform to tooling surfaces that are simply or even unusually contoured as long as such surfaces do not have drastic discontinuities or abrupt corners which would prevent the suction channel 50 from maintaining continuous contact with the forming tool 20.

In the preferred embodiment, the suction channel 50 is made from an extruded silicone rubber material having a "shore A" durometer rating of 45 to 50. The material properties of the suction channel 50 are critical because the material must be flexible enough to deflect under pressure but strong enough to exert forces sufficient to promote the suction channel 50 to firmly adhere to the base plate 30. Also, in the preferred embodiment, the connecting flange members 60 and the flexible mat 40 are made from flexible silicone rubber. As can be readily understood by those skilled in the art, all of the silicone rubber material chosen for the components of the vacuum bag 35, including the adhesives that bond them together, can be chosen to withstand conditions of a pressurized heating process so that the vacuum bag of the present invention may be used in the production of high-strength, light-weight composite components for aerospace vehicles.

The following describes the operation of the vacuum bag assembly of the present invention. Initially, a build-up of laminated cloth layers (not shown) are placed with applied adhesives over the forming surface (not shown) and are extended out onto the flat surface of the base plate 30. A removable non-stick plastic sheet (not shown) covers the laminated cloth build-up.

After the layer or layers of the composite material along with the applied adhesives have been laid on the forming surface of the forming tool 20 and covered by the non-stick plastic layer, the operator places the vacuum bag 35 over the forming tool 20. The vacuum bag 35 is positioned to completely cover the build-up of the cloth layers and to substantially cover the forming tool 20. The operator then smoothes out the vacuum bag 35 to ensure that the suction channel 50 is in continuous contact with base plate 30. The operator activates the vacuum source which causes the vacuum bag 35 along with the suction channel 50 to pull down and adhere to the forming tool 20. The vacuum bag 35 pulls down onto the forming tool 20, and then it stretches to conform to the forming surface of the forming tool 20 providing an evenly distributed pressure to the layers of the composite material laid on the forming tool 20. These same steps can be repeated for an article placed in a pressurized oven except that instead of applying a vacuum with the vacuum line 70, the vacuum line 70 is placed in pneumatic communication with a lower pressure volume outside the oven, drawing gases and creating a relative vacuum in the vacuum bag assembly.

Except as otherwise disclosed herein, the various components shown in outline or block form are individually well known and their internal construction and their operation is not critical either to the making or the using of this invention.

While a detailed description above has been expressed in terms of specific examples, those skilled in the art will appreciate that many of the configurations could be used to accomplish the purpose of the disclosed apparatus. Accordingly, it will be appreciated that various equivalent modifications of the above-described embodiments may be made without departing from the spirit and scope of the invention. Therefore, the invention is to be limited only by the following claims.

What is claimed is:

1. A vacuum bag assembly used in making laminated articles having layers of composite materials and thermosetting resins that are formed and adhesively bonded together, said assembly comprising:

a forming tool on which said composite materials and said thermosetting resins may be positioned, the composite materials having edges well spaced from edges of said forming tool;

a vacuum bag positioned over said composite materials and said forming tool further comprising:

a flexible mat, having an irregular surface contiguous with said composite materials, said flexible mat also having edges well spaced from the edges of the forming tool; and a continuous flexible suction channel having an inner arch-like surface and an outer arch-like surface positioned between the edges of said flexible mat and the edges of said forming tool, said suction channel being attached to said flexible mat by a flexible connecting flange, wherein the flexible connecting flange, the outer surface of said suction channel, the edges of said flexible mat and said forming tool define the walls of an airspace in between said flexible mat said suction channel, the airspace being in pneumatic communication with the irregular surface of said flexible mat.

2. The vacuum bag assembly according to claim 1 further comprising:

a vacuum device secured to said vacuum bag for drawing a vacuum between the irregular surface of said flexible mat and said forming tool, said vacuum device also pulling air out of said airspace and out from under the inner arch-like surface of said suction channel, said suction channel flattening down upon said forming tool thereby establishing an airtight seal between said vacuum bag and said forming tool to secure said vacuum bag assembly tightly against said forming tool.

3. The vacuum bag assembly according to claim 2, wherein the airspace pulls on the flexible connecting flange to cause the flattening of said suction channel.

4. The vacuum bag assembly of claim 1, wherein the irregular surface includes a system of closely spaced interconnected channels embossed in said flexible mat.

5. The vacuum bag assembly of claim 1, wherein the forming tool further includes a flat base portion and a forming surface thereon.

6. The vacuum bag assembly of claim 2, wherein the vacuum device comprises a vacuum line in a pneumatic connection with a vacuum source and a vacuum and a vacuum fitting sealably connecting said vacuum line with said vacuum bag.

7. A vacuum bag assembly used in making articles in which a plurality of composite cloth layers are adhesively bonded together, said vacuum bag comprising:

an air-tight tool including a forming surface surrounded by a substantially flat base plate on which the plurality of composite cloth layers are placed with applied adhesives and covered with a removable plastic sheet to lay-up a workpiece;

a vacuum bag laid over the workpiece and the forming surface completely covering the workpiece and the forming surface and extending to substantially cover the base plate, said vacuum bag further including:

a flexible mat having edges well spaced from the edges of the base plate, the flexible mat also having a substantially smooth upper surface and a lower surface in contact with said airtight tool, the lower surface being embossed with a system of closely spaced interconnecting air channels which open out onto the edges of the flexible mat;

a continuous flexible suction channel position between the edges of said flexible mat and the edges of the base plate, the suction channel having a raised center portion, a first leg proximate to the edges of the flexible mat extending down from the center portion and toward the edges of the flexible mat, and a second leg distal to the edges of the flexible mat extending down from the center portion and away from the edges of the flexible mat, the first and the second leg of said suction channel in continuous contact with the base plate;

a continuous flexible connecting flange member bonded to the upper surface of the flexible mat and the center portion of the flexible suction channel, the suction channel, the flexible mat, the flexible connecting flange member, and the base defining the walls of a continuous air-tight chamber about the periphery of the vacuum bag which is in pneumatic communication with the closely spaced system of the air-channels embossed in the lower layer of said flexible mat; and a vacuum line in communication with a vacuum source secured to the vacuum bag by a fitting, the vacuum source drawing a vacuum within the volume defined by the closely spaced system of air-channel embossed in the lower surface of the flexible mat and the walls of the continuous air-tight chamber about the edges of the vacuum bag, the vacuum urging air out from under the suction channels, the second leg of the suction channel maintaining air-fight contact with the base plate as the suction channel is pushed down upon the base plate by ambient air pressure causing the suction channel to firmly adhere to the base plate thereby securing the vacuum assembly tightly against the air-tight tool.

* * * * *